April 12, 1960 P. A. LANG 2,932,093
RADAR TRAINING APPARATUS FOR OBSERVERS
Filed June 23, 1955 2 Sheets-Sheet 1
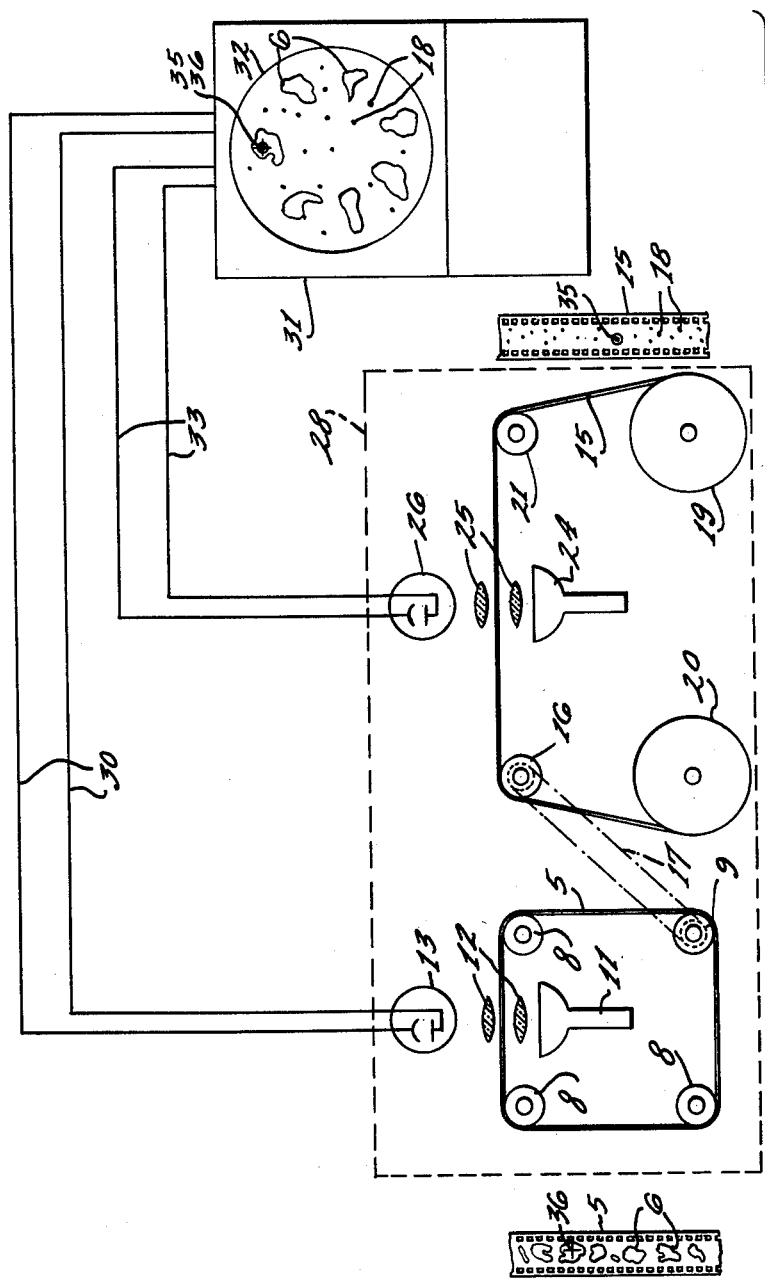
INVENTOR.
Paul A. Lang
BY
ATTORNEY.

April 12, 1960   P. A. LANG   2,932,093
RADAR TRAINING APPARATUS FOR OBSERVERS
Filed June 23, 1955   2 Sheets-Sheet 2
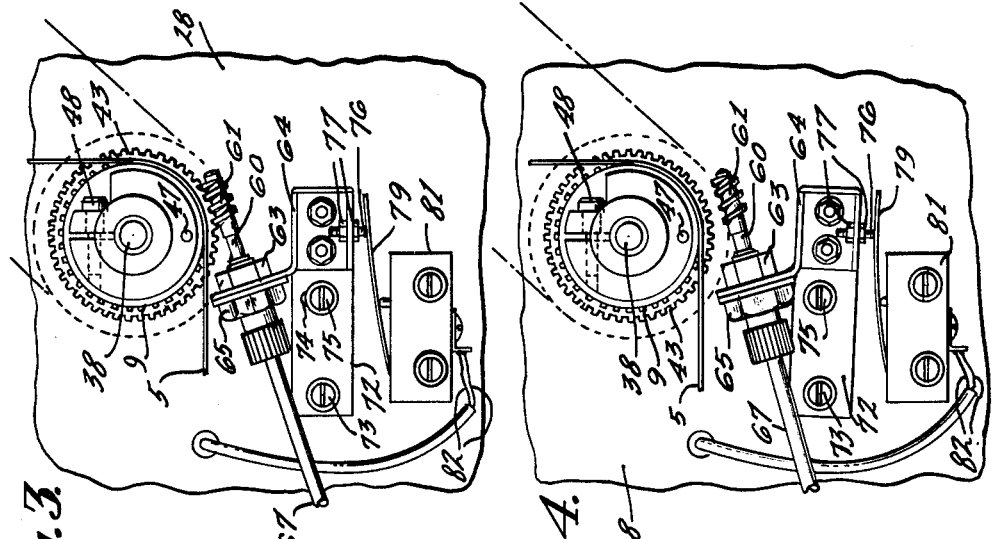
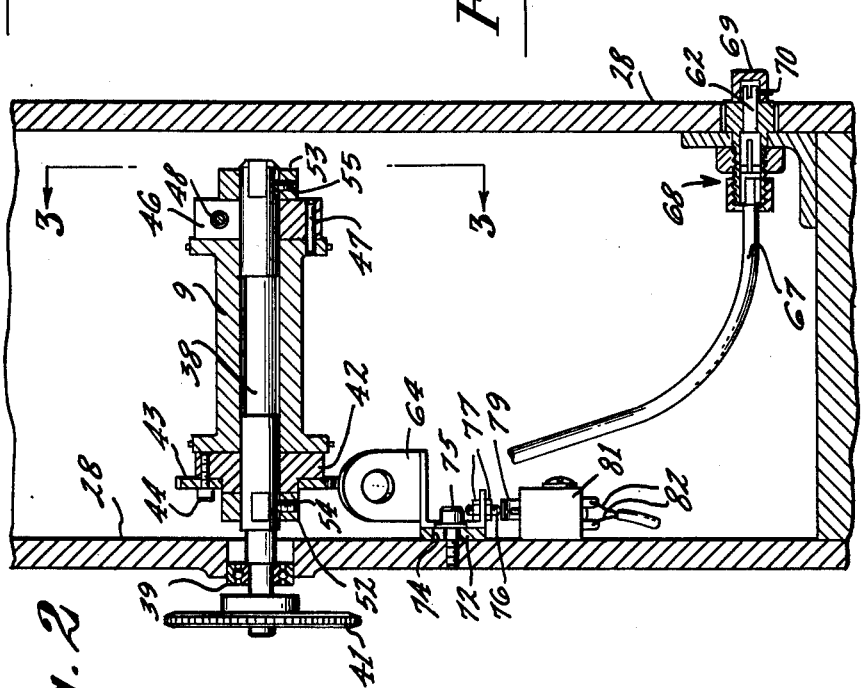
INVENTOR.
Paul A. Lang
BY
ATTORNEY.

United States Patent Office 2,932,093
Patented Apr. 12, 1960

2,932,093

RADAR TRAINING APPARATUS FOR OBSERVERS

Paul A. Lang, Los Angeles, Calif., assignor, by mesne assignments, to the United States of America as represented by the Secretary of the Air Force Application June 23, 1955, Serial No. 517,569

4 Claims. (Cl. 35—10.4)

This invention relates to training equipment, and particularly to equipment for training ground observers to locate targets, such as airborne units, by radar images.

The use of radar in determining the location of targets with respect to a certain terrain on a plan position indicator is known. However, to properly interpret the images observed on the screen requires experience. To obtain this experience without actually operating complete radar detecting equipments, a system creating synthetic problem situations has been provided. As far as the trainee is aware, the images are exactly those obtained under actual conditions. Training with the system thus increases the accuracy and ability of the observers who are to use radar in the location of the targets.

The system utilizes a permanent echo loop film on which are images of 360° of a certain terrain. Another portion of the equipment is a film on which are one or more problems in the form of synthetic targets. The two films are detected by television equipment and the images superimposed upon a plan position indicator as in actual practice. Since the entire test is dependent upon accurate synchronization of the two films which are driven by a mechanical interlocked drive, a remote control synchronizing adjustment is provided. This adjustment is made from a remote point since the films are detected by television and are enclosed within a light-proof case.

The principal object of the invention, therefore, is to facilitate the synchronization of radar training films.

Another object of the invention is to provide an improved synchronization system for a pair of films, the driving mechanism therefor being mechanically interlocked.

A further object of the invention is to provide an improved system for remotely adjusting the synchronization of two separate films from a remote point, the images on the film being superimposed upon one another.

The novel features which are believed to be characteristic of this invention, both as to the manner of its organization and the mode of its operation, will be better understood from the following description, when read in conjunction with the accompanying drawings, in which:

Fig. 1 is a diagrammatic view of radar training equipment or apparatus embodying the invention;

Fig. 2 is a cross-sectional view of a remotely controlled adjusting mechanism for one of the films of the system shown in Fig. 1;

Fig. 3 is an end view of the adjusting mechanism shown in Fig. 2; and

Fig. 4 is a view of the mechanism shown in Fig. 3 in an adjusted position.

Referring now to the drawings, and particularly to Fig. 1, a permanent echo film loop 5, preferably on 70 mm. film, has images of 360° of a certain terrain positioned thereon, these images being of the type obtained on a radar screen. A plan view of a section of the film is shown with images 6 thereon, which may represent mountains, lakes, or other geographical features of a certain area. The film 5 is a continuous loop guided by rollers 8 and driven by a sprocket 9. A cathode ray tube 11 produces a flying spot of light which is projected on the images 6 on the film 5 and then projected on a photoelectric cell 13 by lenses 12.

A problem film 15, a plan view showing synthetic targets 18 representing planes, guided missiles, or other types of airborne units, is driven by a sprocket 16 mechanically connected with sprocket 9 by a belt or chain 17. The sprocket 16 advances the film 15 from a reel 19 to a takeup reel 20 around a roller 21. The problem film 15 has the synthetic targets in the form of pips which simulate the appearance of actual targets on a plan position indicator. Film 15 is scanned by cathode ray tube 24 and the light from the tube and from the film 15 is projected by lenses 25 to a photoelectric cell 26. All of the equipment just described is enclosed in a light-tight casing indicated by the dot-and-dash line 28.

The photocell 13 detecting the echo loop is connected over conductors 30 to the plan position indicator console 31 having a tube screen 32. The photoelectric cell 26 detecting the problem film is also connected to the console 31 over conductors 33 so that the images on both the film 5 and on the film 15 are superimposed upon one another as indicated by the terrain markings 6 and the synthetic target markings 18.

To properly present the problem to the student or trainee, the films 5 and 15 must be correlated; that is, a certain synthetic target, such as shown at 35, must be located at a certain position with respect to the terrain images on the permanent echo loop, as indicated at 36. Since the advancing mechanisms for the two films 5 and 15 are mechanically connected, it is necessary that provision be made for moving one of the films with respect to the other in order to synchronize the position 35 with the position 36 without disturbing the mechanically-connected drive. This is accomplished by the mechanism shown in Figs. 2, 3, and 4 which will now be described.

In these figures, the casing 28 is shown having mounted thereon a shaft 38 in a bearing 39, one end of the shaft having a sprocket wheel 41 thereon. Also on the shaft and rotatable thereon, is sprocket 9, one end abutting a sleeve 42 attached to a worm gear 43 by screws, one of which is shown at 44. Abutting the other end of the sprocket 9 is a split clamp 46 which may be tightened on the shaft 38 by a screw 48. The clamp is pinned to the sprocket 9 by pin 47, so that when the clamp is rotated by the shaft, the sprocket is rotated. Abutting the sleeve 42 and the clamp 46 are respective collars 52 and 53 held fixedly in position on the shaft 38 by respective set screws 54 and 55. These collars maintain the sprocket assembly in position at all times. When the screw 48 is loosened, the sprocket 9 may be rotated upon the shaft 38 when the worm gear 43 is rotated.

Referring now to Figs. 3 and 4 along with Fig. 2, a flexible drive shaft 60, having a worm 61 on one end thereof and a slotted terminal 62 at the other end thereof, passes through a cartridge 63 held in position on a bracket 64 by a nut 65. The shaft 60 is enclosed in a flexible casing 67 having one end attached to the casing 28 by a light tight assembly 68, the shaft 60 extending externally of the housing 28. The slit end 62 of the shaft may be enclosed by a cover 69 held in position on the shaft by a set screw 70.

The bracket 64 is mounted on a plate 72 pivotable on a bolt 73, movement thereof being permitted by an arcuate slot 74 in which is a bolt 75. At one end of the plate is a switch-actuating pin 76 which may be adjusted by a pair of nuts 77. The pin actuates a lever arm 79 which makes and breaks a contact within a switch 81 connected over conductors 82 with a film advancing motor (not shown).

By the pivoting of the plate 72 carrying the bracket 64 supporting the worm 61, the worm 61 may be engaged with and disengaged from the worm gear 43.

Fig. 3 shows the worm and worm gear in engagement, and Fig. 4 shows the worm and worm gear out of engagement. Thus to advance the permanent echo loop 5 to bring the point 36 in coincidence with the point 35 on the synthetic target film, the clamp 46 is loosened by loosening the screw 48, the plate 72 is pivoted to bring the worm and worm gear into engagement, the housing 28 is then closed, and a screw driver or similar instrument is inserted in the notch in the end 62 of the shaft 60. The housing is then closed and the films scanned and the generated currents transmitted to the plan position indicator console 31. The sprocket 9 is then rotated by the turning of flexible shaft 60 to bring the two points 35 and 36 into coincidence. After this adjustment is made, the housing is opened, the screw 48 and the clamp 46 tightened, and the plate 72 rotated to disengage the worm 61 from the worm gear 43. When the worm and worm gear are in engagement, the circuit through the switch 81 is broken, which prevents the energization of the motor driving the film advancing mechanism. However, when the worm is disengaged from the worm gear, as shown in Fig. 4, the switch 81 is closed and the film advancing motor may be energized. This latter is a safety feature of importance.

To provide the proper ratio of turning moment for the sprocket 41, a 90° turn of the shaft 60 will produce approximately one-half degree of arcuate motion of the film sprocket 9. This ratio has been found desirable for obtaining an accurate coincidence of the point 35 on the target film with the point 36 on the permanent echo loop.

I claim:

1. An observer training system having a film with simulated radar images thereon corresponding to a certain terrain and a second film having synthetic simulated radar target images thereon, said system comprising a light-tight casing, means within said casing adapted to simultaneously scan each of said films, a plan position indicator externally of said casing and on which the images of said films are simultaneously superimposed over their entire areas, independent means within said casing for simultaneously advancing each of said films, a mechanical connection within said casing between each of said independent advancing means for said films, and means for advancing one of said films with respect to the other of said films from a point externally of said casing for superimposing a certain point on one of said films on a certain point on the other of said films on said plan position indicator for correlating all points on the entire areas of both of said films during the simultaneous advancement of both of said films, said independent means including a film driving sprocket wheel, a shaft attached to said sprocket wheel, a film advancing sprocket on and independently rotatable on said shaft, said last-mentioned means including a gear train and a shaft extending from said sprocket to a point externally of said casing for rotating said film advancing sprocket from said point externally of said casing.

2. An observer training system having a film with simulated radar images thereon corresponding to a certain terrain and a second film having synthetic simulated radar target images thereon, said system comprising a light-tight casing, means within said casing adapted to simultaneously scan each of said films, a plan position indicator externally of said casing and on which the images of said films are simultaneously superimposed over their entire areas, independent means within said casing for simultaneously advancing each of said films, a mechanical connection within said casing between each of said independent advancing means for said films, and means for advancing one of said films with respect to the other of said films from a point externally of said casing for superimposing a certain point of one of said films on a certain point on the other of said films on said plan position indicator for correlating all points on the entire areas of both of said films during the simultaneous advancement of both of said films, said independent means including a film advancing sprocket, and said last-mentioned means including a shaft for driving said sprocket, a gear for driving said sprocket independently of said shaft, a gear in mesh with said driving gear, and a shaft from said driving gear to a point externally of said casing for driving said last-mentioned gear from said point externally of said casing, a motor and power supply therefor being provided for driving said sprocket together with means for engaging and disengaging said gears, said last-mentioned means including a switch adapted to be opened when said gears are moved into engagement and to be closed when said gears are moved into disengagement to disconnect and connect said motor to said power supply.

3. An observer training system using a film having simulated radar images thereon of a certain terrain and a second film having synthetic simulated radar target images thereon comprising a light-tight casing, independent means in said casing adapted to advance each of said films, a mechanical connection in said casing between said film advancing means, means in said casing for independently producing currents corresponding to the images on each of said films, a plan position indicator externally of said casing having a picture tube on which the entire areas of said images are superimposed, and means in said casing for advancing one of said films in either direction independently of the other of said films to superimpose a certain synthetic target point upon a certain geographical point of said area, said last-mentioned means being operable externally of said casing during the production of said currents, one of said independent means including a sprocket, and said last-mentioned means including a shaft for rotating said sprocket, said shaft being adapted to be driven by said mechanical interconnecting means, a gear attached to said sprocket for rotating said sprocket independently of said shaft, a second gear adapted to engage and be disengaged from said first-mentioned gear, and a shaft for rotating said last-mentioned gear from a point externally of said casing.

4. An observer training system using a film having simulated radar images thereon of a certain terrain and a second film having synthetic simulated radar target images thereon comprising a light-tight casing, independent means in said casing adapted to advance each of said films, a mechanical connection in said casing between said film advancing means, means in said casing for independently producing currents corresponding to the images on each of said films, a plan position indicator externally of said casing having a picture tube on which the entire areas of said images are superimposed, and means in said casing for advancing one of said films in either direction independently of the other of said films to superimpose a certain synthetic target point upon a certain geographical point of said area, said last-mentioned means being operable externally of said casing during the production of said currents, one of said independent means including a sprocket, and said last-mentioned means including a shaft for rotating said sprocket, said shaft being adapted to be driven by said mechanical interconnecting means, a gear attached to said sprocket for rotating said sprocket independently of said shaft, a second gear adapted to engage and be disengaged from said first-mentioned gear, and a shaft for rotating said last-mentioned gear from a point externally of said casing, said last-mentioned means also including a pivoted bracket supporting said second gear, said bracket having switch actuating means thereon.

References Cited in the file of this patent

UNITED STATES PATENTS

| | | |
|---|---|---|
| 1,670,835 | Berge | May 22, 1928 |
| 2,711,668 | Dresser | June 28, 1955 |
| 2,737,730 | Spencer | Mar. 13, 1956 |